July 2, 1968  G. VALLETEAU DE MOULLIAC  3,390,788
AUTOMATIC COUPLER HEAD WITH WIDE HORIZONTAL RANGE
OF ACTION AND REDUCED COUPLING WIDTH
Filed June 14, 1966  10 Sheets-Sheet 1

INVENTOR:
GUY VALLETEAU de MOULLIAC
BY
Breitenfeld & Levine
ATTORNEYS

July 2, 1968  G. VALLETEAU DE MOULLIAC  3,390,788
AUTOMATIC COUPLER HEAD WITH WIDE HORIZONTAL RANGE
OF ACTION AND REDUCED COUPLING WIDTH
Filed June 14, 1966  10 Sheets-Sheet 4

INVENTOR:
GUY VALLETEAU DE MOULLIAC
BY
ATTORNEYS

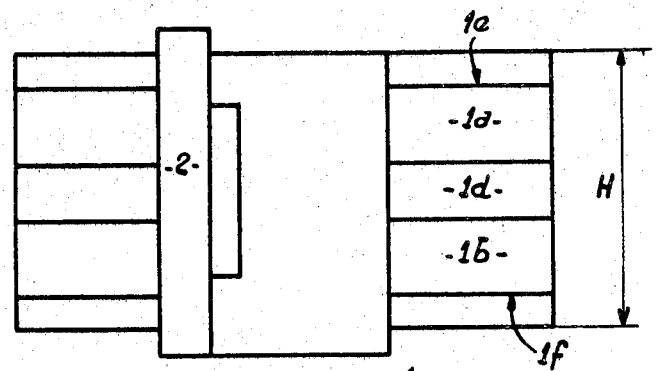
Fig. 11
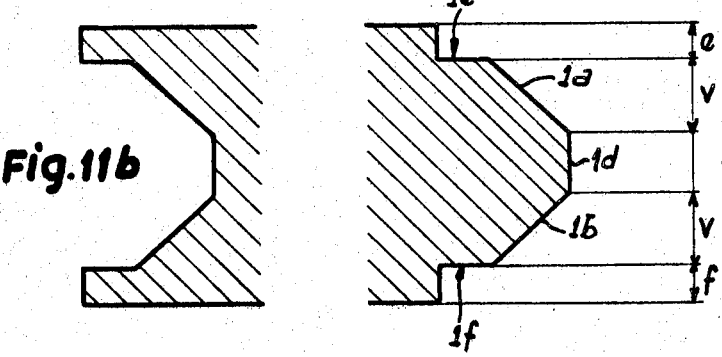
Fig. 11b
Fig. 11a
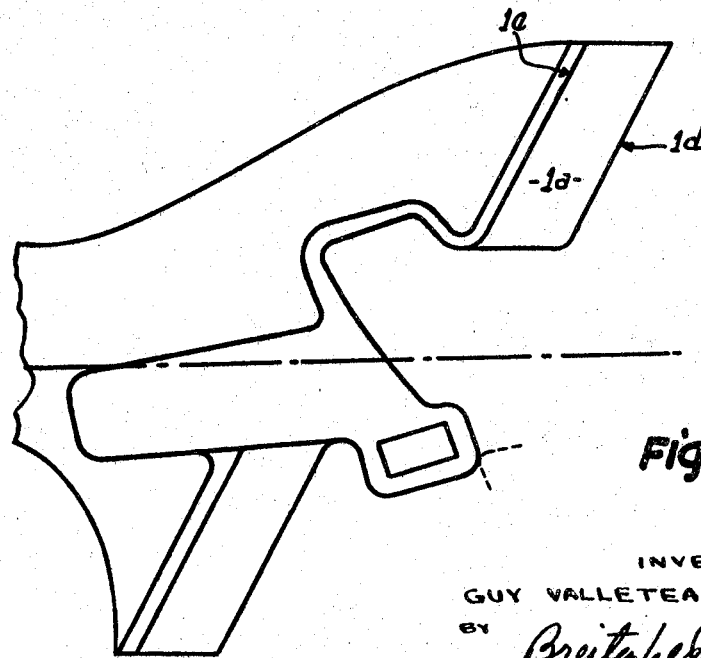
Fig. 12

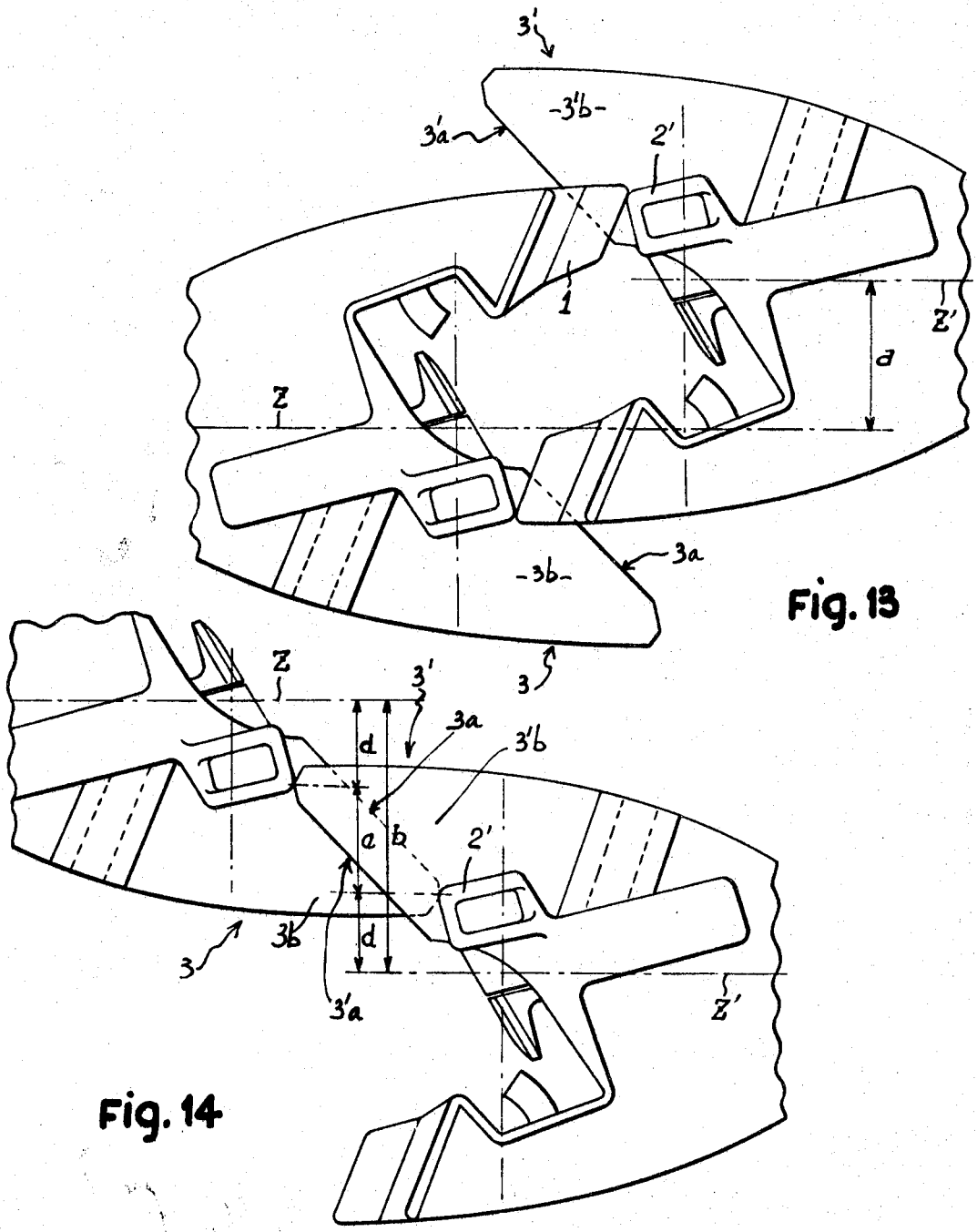

INVENTOR:
GUY VALLETEAU DE MOULLIAC
BY Breitenfeld & Levine
ATTORNEYS

United States Patent Office
3,390,788
Patented July 2, 1968

3,390,788
AUTOMATIC COUPLER HEAD WITH WIDE HORIZONTAL RANGE OF ACTION AND REDUCED COUPLING WIDTH
Guy Valleteau de Moulliac, Argenteuil, France, assignor to Societe Generale Isothermos, a company of France
Filed June 14, 1966, Ser. No. 557,510
Claims priority, application France, June 15, 1965, 20,834
2 Claims. (Cl. 213—100)

ABSTRACT OF THE DISCLOSURE

Coupler head has large hook-shaped claw and small prismatic claw on its front face. Large claw has protruding portion defined by forwardly converging surfaces terminating in vertical surface at front and horizontal surfaces behind, and recess behind small claw correspondingly shaped to accommodate protruding portion. Horn below and in front of small claw has vertical surface oblique to longitudinal axis of head, and a horizontal top surface.

---

Figure 1:
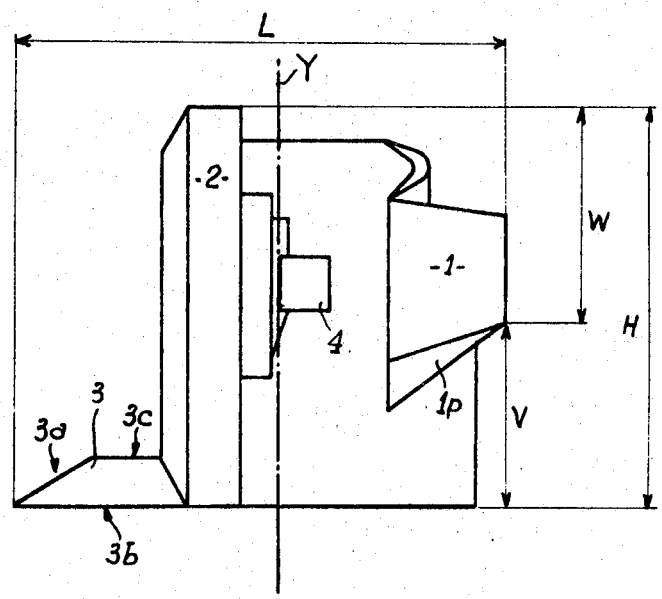

The present invention relates to coupler heads of rigid automatic coupling of the type having on the front face a large hook-shaped claw and a small claw of prismatic shape, and parts in relief located on the front face of the large claw and recessed parts located behind the large claw or vice versa.

The two heads of a coupling which are articulated respectively to the two railway vehicles to be connected, occupy relative positions which depend on the respective locations of the two vehicles, which locations in their turn depend on the profile of the track, the load of the vehicles, etc., and it may happen in the initial phase of their movement towards each other that the two heads are offset with respect to each other in the horizontal plane and/or in the vertical plane, and/or oblique with respect to each other.

A more extensive approaching of the heads to each other starting from their initial positions must take place in such a manner as to gradually do away with any obliqueness and offset, and it is already known to provide the heads with cooperating means to guide them suitably towards each other until their rigid coupling is assured.

These means define what those skilled in the art term "the horizontal range of action," the "vertical range of action," the "angular take-up in the horizontal plane," the "angular take-up in the vertical plane" (or torsion take-up) and the rigid holding of the coupler heads.

The present invention relates in particular to the means which define the horizontal range of action and provides characteristically, by comprising within these means, an appendage extending from below the small claw and advancing obliquely forward, the claws and the said appendage each contributing its part in obtaining the horizontal range of action.

The relief or recessed portions located on the large claw and behind the small claw may be of a type known per se, and for example, may have planes inclined horizontally, the planes of the recessed parts of one head cooperating with the corresponding planes of the protruding parts of the other head of the coupling to effect the guiding upon vertical rising of one head with respect to the other.

The appendage extending from the bottom of the small claw, obliquely towards the front, may also be of a type known per se, and for instance be of a type similar to the guide "horns" with which some known heads are provided.

The fundamental characteristic of the invention, namely the simultaneous presence of these protruding and recessed parts and of this appendage in order to obtain the vertical range of action and the horizontal range of action makes it possible to avoid the well known drawbacks of the known coupler heads referred to above.

When the means which define the horizontal range of action of a head are actually formed solely by claws, simple geometrical comnsiderations make it possible to establish that the width of coupling—which width it is advantageous to maintain as small as possible in order to reduce the space taken up by it—varies four times the horizontal range of action (multiplied by a constant), which range of action, on the other hand, is advantageously as large as possible, these contradictory desires do not make it possible to impart to these coupler heads a very large horizontal range of action.

On the other hand, a very large horizontal range of action can be obtained without increasing the coupling width, when said heads are also provided with an appendage, as contemplated by the invention, said appendage extending forward and obliquely and not contributing to increasing said width.

The known heads, the means of which define the vertical range of action consist exclusively of a "horn" which protrudes laterally towards the end and towards the front below the small claw, and of contact surfaces for said horn located below the large claw. While they do not have any drawback in the sense that their horizontal range of action can be increased without substantial increase of the coupling width, they are, on the other hand, disadvantageous due to the fact that in these heads the horn must generally descend sufficiently down below the longitudinal axis of the head for it to be possible to act as guide for vertical rising. The coupler head then, as a result of having below the said axis a large size which is prejudicial to the operation of the couplers which, during the transition period when it is still necessary manually to effect the connecting of the coupling hoses of the compressed air conduits, must effect this connection during the coupling.

Such a downward extension of the horn is, on the other hand, no longer necessary when the head is provided, in accordance with the invention, with protruding and recessed portions which are in themselves sufficient to play the role defined above.

The invention therefore in the final analysis provides coupler means which take up a reduced amount of space laterally and vertically, without prejudice to the horizontal and vertical ranges of action of these heads.

The accompanying figures, showing various embodiments of the invention, will make it better understood how the invention can be reduced to practice, every detail described or shown in the drawings falling within the invention.

Figure 3:
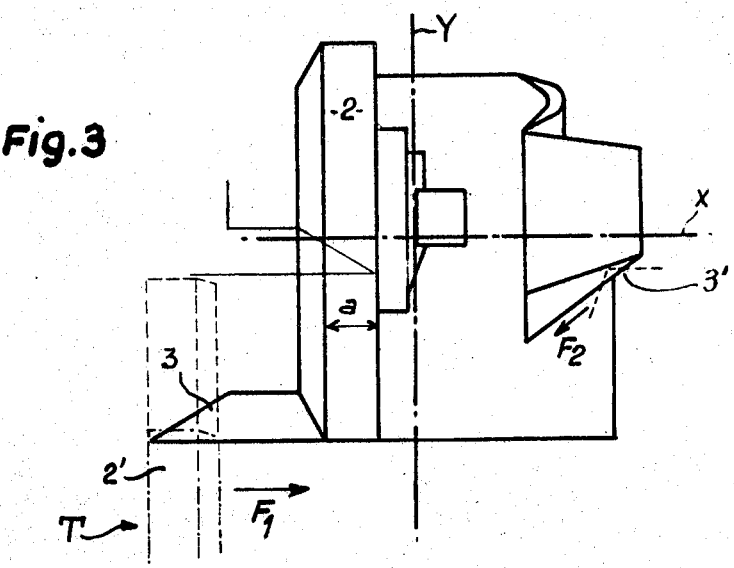
Figure 2:
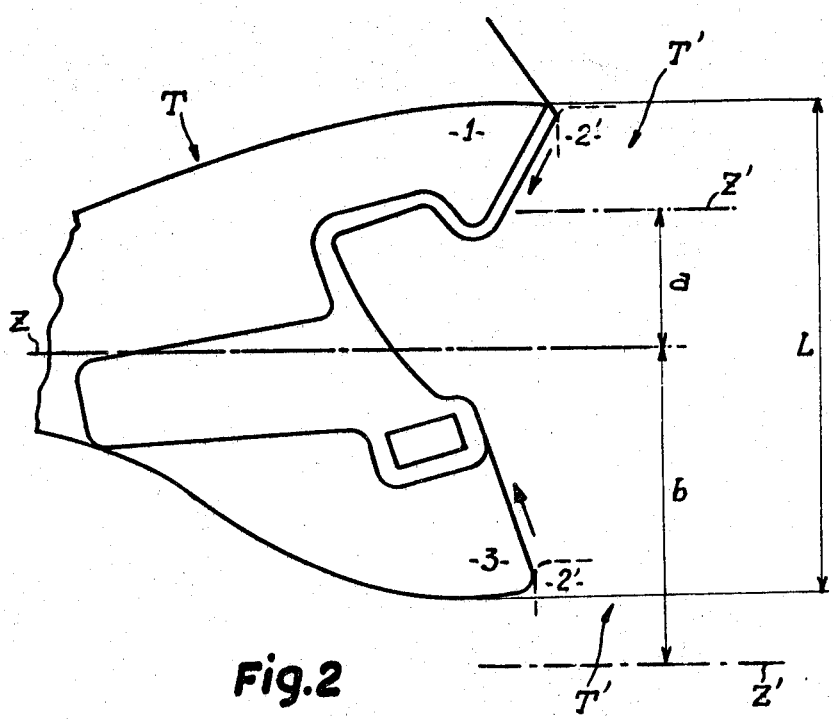

FIGURES 1 to 3 relate to a known theoretical type of horn coupling head of a width proportional to twice the value of the horizontal range of action of the head, which is Seen from the front in FIGURE 1;

Seen from above in FIGURE 2, which shows the limits defining the horizontal range of action of the head;

Seen from the front in FIGURE 3, which shows the limits defining the vertical range of action of the head.

Figure 4:
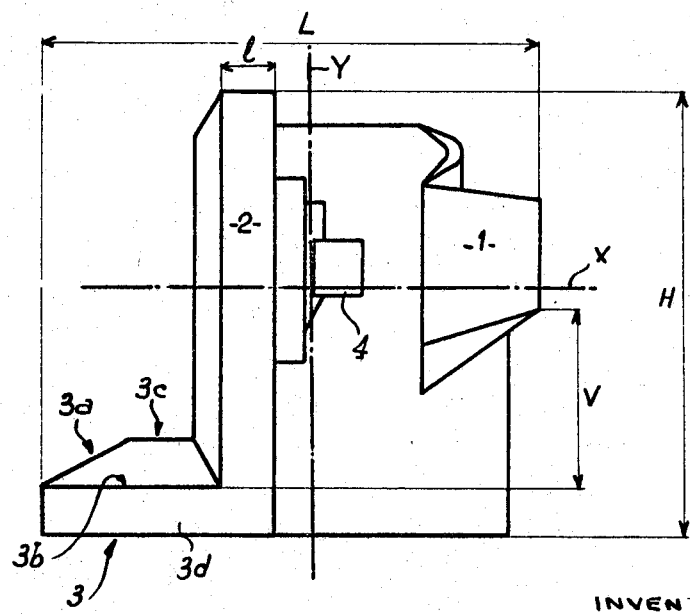

FIGURE 4 shows a schematic front view of a practical embodiment of a head corresponding to the theoretical type shown in FIGURES 1 to 3.

Figure 5:
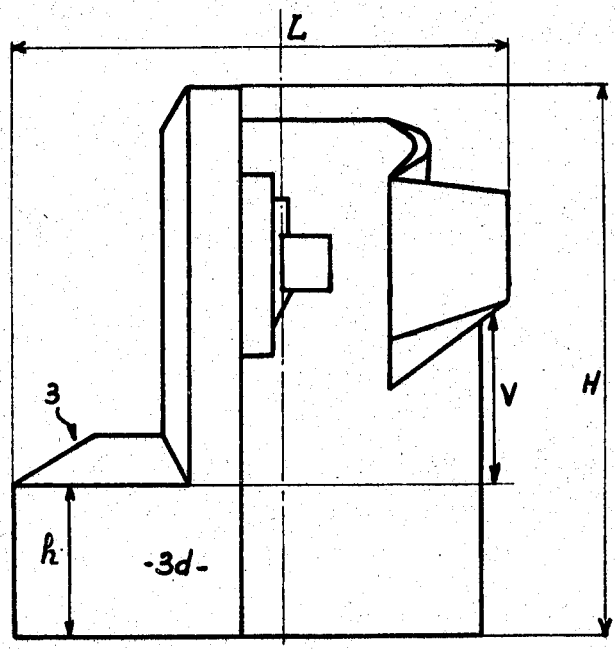
Figure 8:
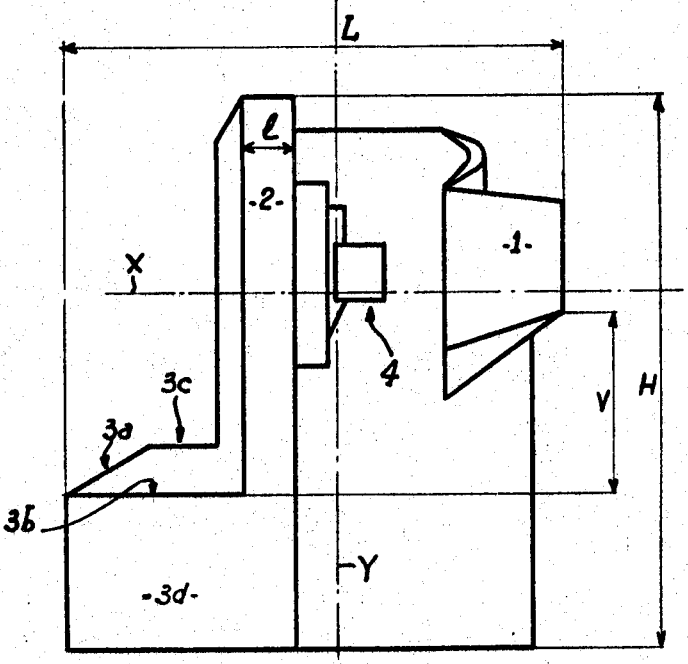
Figure 7:
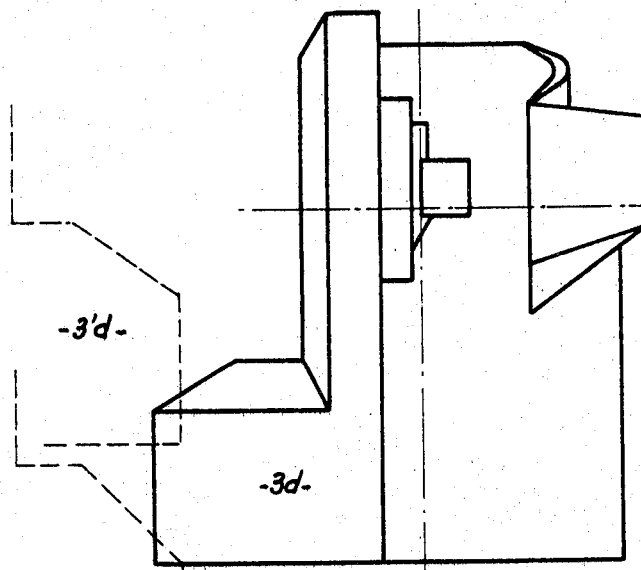
Figure 6:
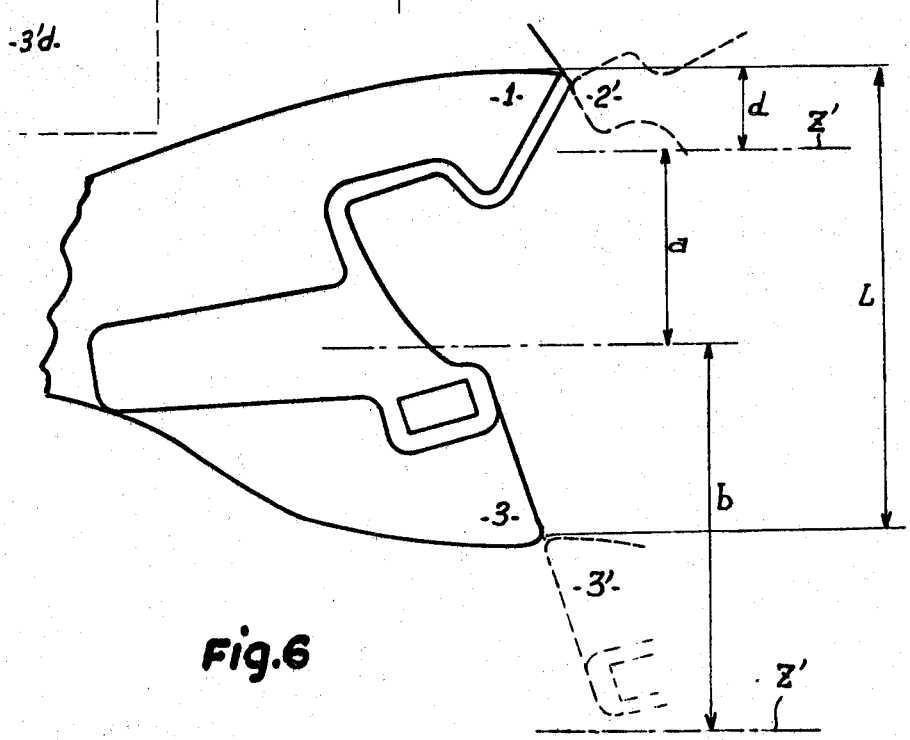

FIGURES 5 to 7 relate to another known theoretical type of horn coupler head of a width proportional to 4/3 the value of the horizontal range of action of the head, which is:

Seen from the front in FIGURE 5;

Seen from the top in FIGURE 6, which shows the limits defining the horizontal range of action of the head;

Seen from the front in FIGURE 7 which shows the limits defining the vertical range of action of the head;

FIGURE 8 shows a schematic front view of a practical embodiment of a head corresponding to the theoretical type in FIGURES 5 to 7.

FIGURES 9, 9a, 9b and 10 relate to a known theoretical type of couper head without horn having on the front face of the large claw, and behind the small claw, portions in relief and recessed, respectively, the width of this head varying as four times the value of its horizontal range of action.

Figure 9:
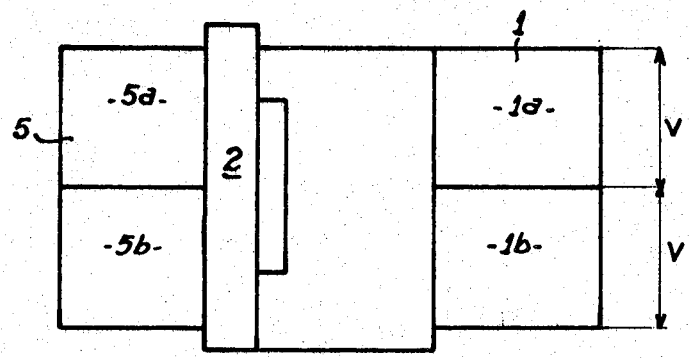
Figures 9A, 9B:
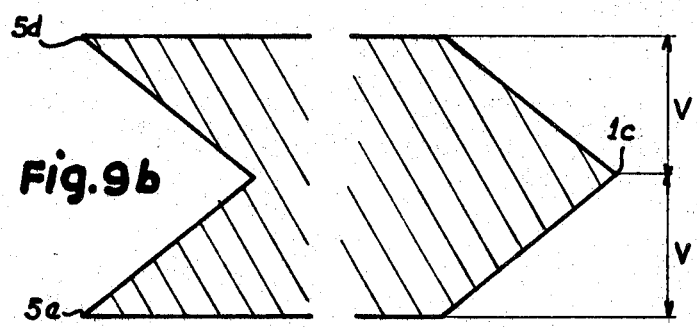
Figure 10:
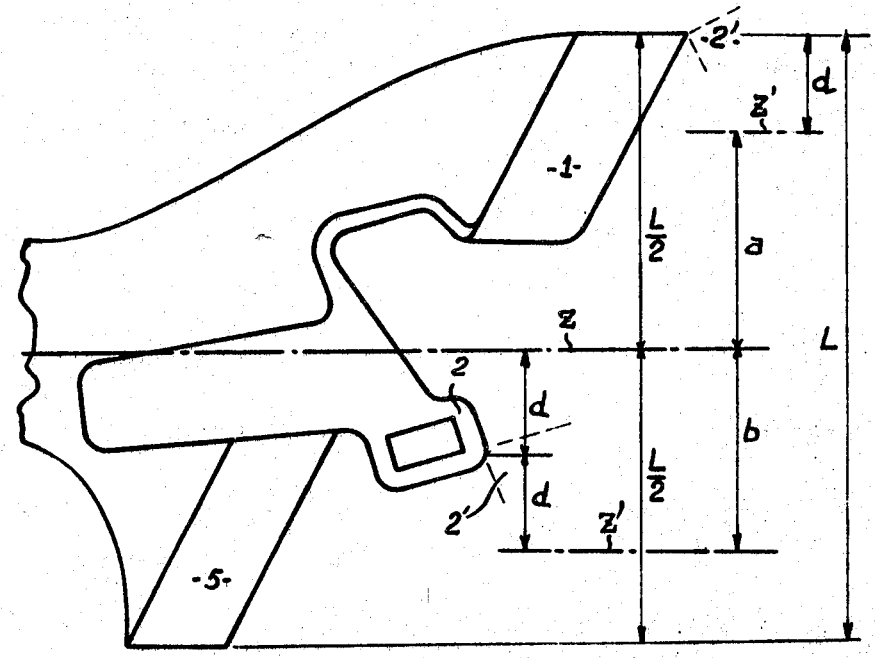

This head is: shown from the front in FIGURE 9, and in cross section in FIGURES 9a and 9b which show the profile of the protruding and recessed portions, and from the top in FIGURE 10 which shows the limits defining the horizontal range of action of the head.

FIGURES 11, 11a and 11b and 12, which correspond respectively to FIGURES 9, 9a, 9b and 10 relate to a known practical variant of the head of FIGURES 9 to 10.

FIGURES 13 and 14 relate to a coupler head in accordance with the invention, the two figures each showing conditions of limit contact between two associated heads seen from above.

Figure 15:
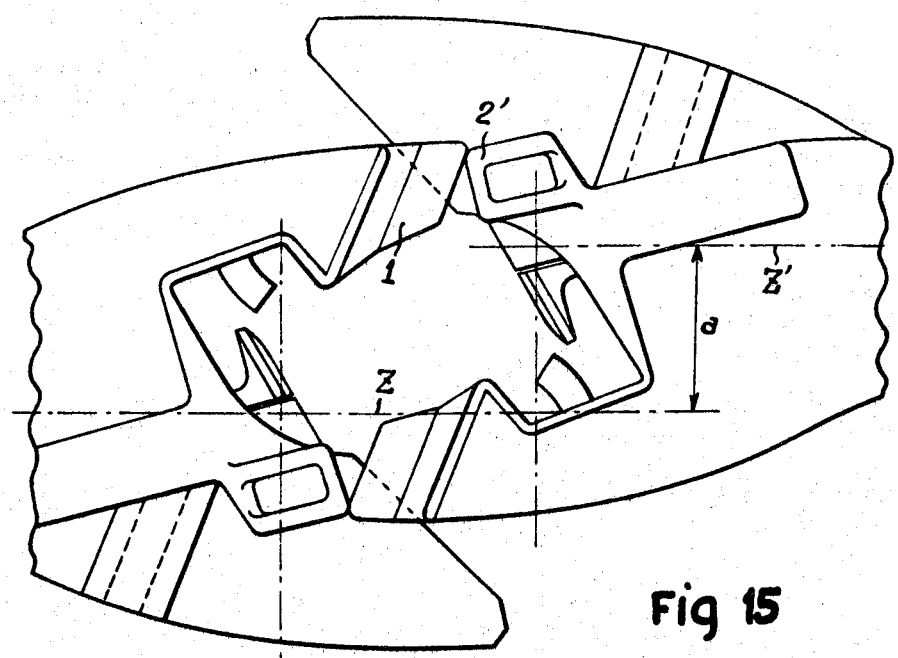
Figure 16:
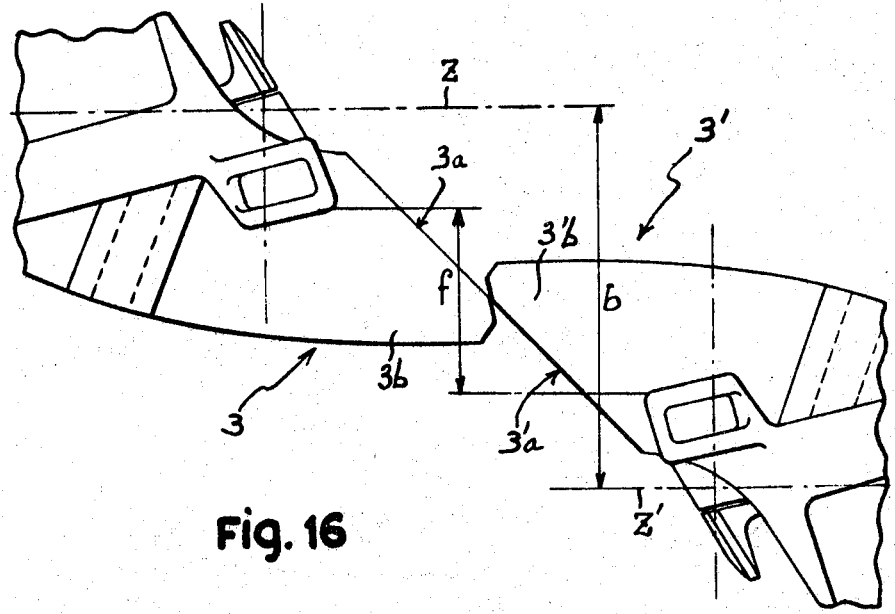
Figure 17:
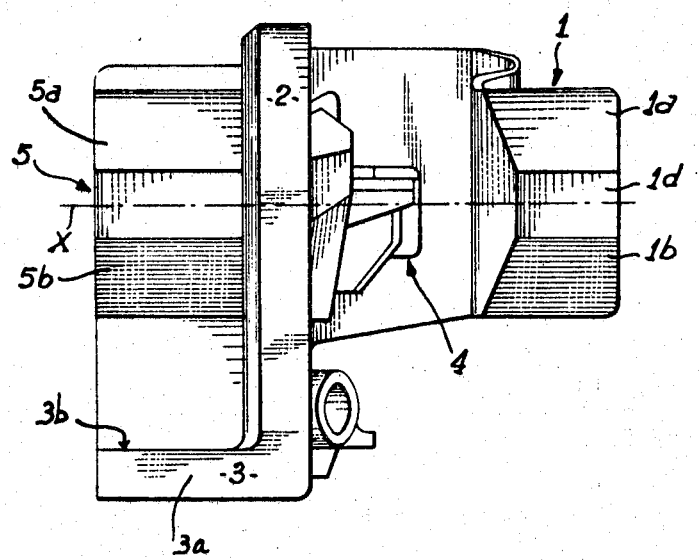
Figure 18:
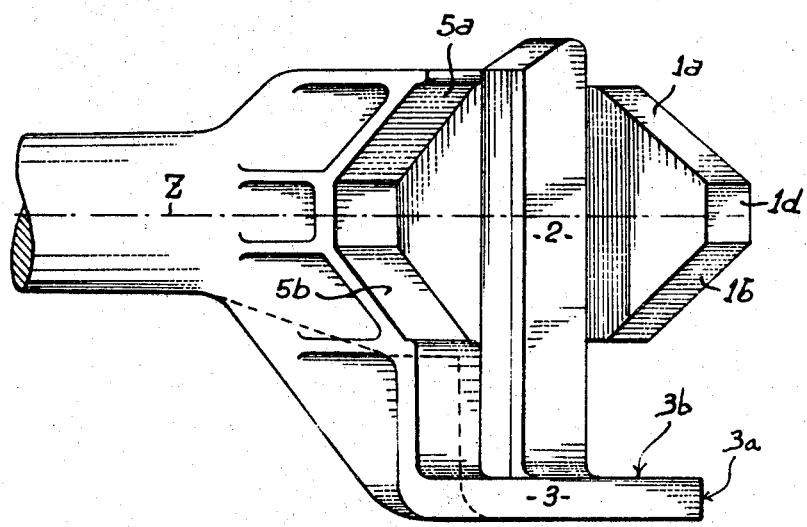
Figure 19:
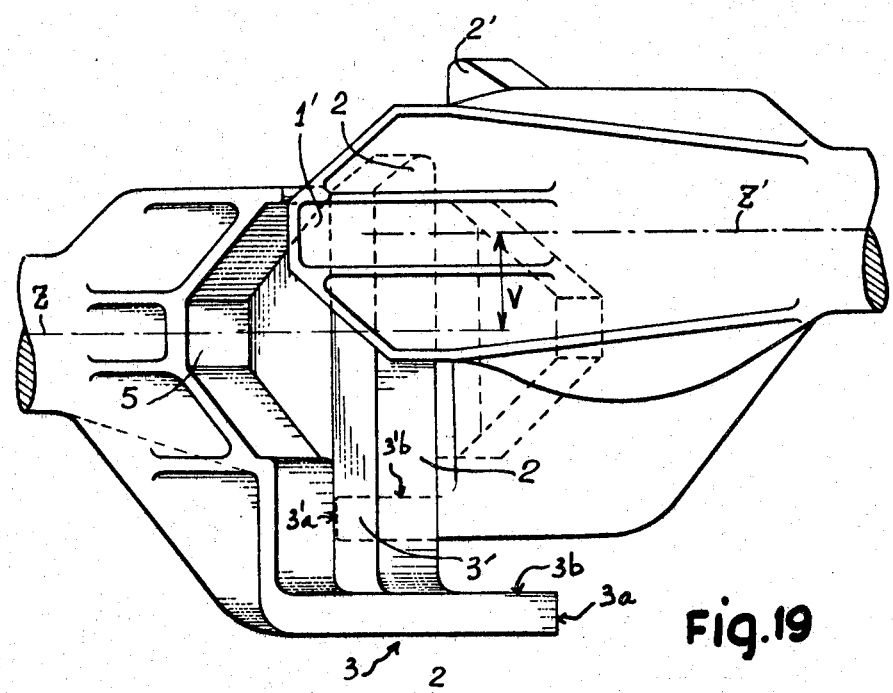
Figure 20:
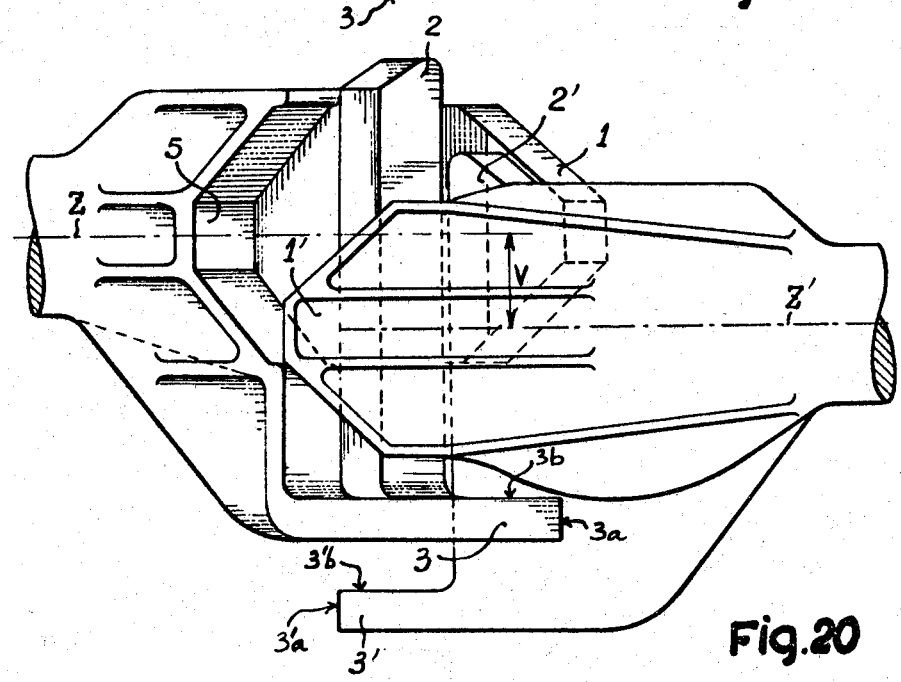

FIGURES 15 and 16 correspond to FIGURES 13 and 14 respectively, but for a variant of the coupler head of the invention, and FIGURES 17 to 20 relate to a practical embodiment of the head of the invention, which is seen from the front in FIGURE 17 and in its length in FIGURE 18, FIGURES 19 and 20 showing in profile view two such heads of a coupling in two cooperating positions corresponding to the limits of the vertical range of action.

FIGURES 1 to 4 relate to a theoretical horn head of width L and height H, comprising in essence a large hook-shaped claw 1, a small prismatic claw 2 and a horn 3 extending from below the small claw in obliquely forward direction.

The horn 3, which as a result of its location, plays a part in defining the horizontal and vertical ranges of action of the head, is provided on the top with inclined sloped portions 3a which can cooperate with corresponding slopes 1p located below the large claw of the associated coupler head to guide the vertical rising of one head with respect to the other up into the rigid coupling of the heads.

The figures also show at 4 a basic representation of the locking system of the head, and at X, Y, Z the three axes of the head, Z designating its longitudinal axis and Y its vertical axis.

When two heads are associated to form a coupling, the initial contact of the heads must take place under conditions which permit the further sliding of one head on the other until the two heads are in the correct coupling positions.

In FIGURE 2 there has been shown a coupler head T of the type in question and the small claw 2', as well as the longitudinal axis Z' of the associated identical coupler head T', in two limit positions of initial cooperation.

In one limit position the initial contact of the heads takes place between the end of the horn 3 of the head T and the small claw 2' of the horn T', which correspond to an offset $b$ between the longitudinal axes Z and Z' of the two heads.

In the other limit position, the initial contact of the heads takes place between the end of the large claw 1 of the head T and the small claw 2' of the horn T', which corresponds to an offset $a$ between the longitudinal axes of the two heads.

It is seen that starting from either of these limit contacts, the head T' moves relative to the head T in the direction indicated in each case by an arrow, until the axes Z' and Z merge at the time of the rigid coupling of the heads.

By definition, the length $a+b$ designates the total horizontal range of action of the heads and simple geometrical analyses (FIGURE 2) makes it possible to see that this total range of action $(a+b)$ is also equal to the width L of the head.

Rather than this total range of action, one generally considers the range of action expressed with respect to the axis of symmetry of the coupling, namely "C," which is half thereof; the range of horizontal action is then expressed as equal to ±C. Under these conditions it is seen that in the type of head theoretically shown, the width L of the head is equal to two times the horizontal range of action C.

In order that the horizontal sliding of one head on the other towards the position of rigid coupling is possible from the initial contact of the heads, this initial contact must be established at the latest between the horn 3 of one head T and the upper part of the small claw 2' of the associated head T' (contact represented on the left hand part of FIGURE 3), the head T' sliding as indicated by the arrow $F_1$ to permit the reciprocal action of the slopes of the horn from the bottom of the large claw, or between the upper portion of the horn 3' and the bottom of the large claw 1 (contact shown in the right hand portion of FIGURE 3), the head T' sliding then downward as indicated by the arrow $F_2$.

Under these circumstances, the path of vertical action of one head is defined as the distance V between the bottom of the large claw of the head and the lower level of the slopes 3a of the horn of the head (FIGURE 1).

In order that the cooperation of the heads be possible within the limits of the vertical range of action, it is necessary, taking into account the identity of the two coupler heads, that the height W of each head above the bottom of the large claw (FIGURE 1) be at least equal to the value V of the vertical range of action. Thus the height H of the head is at least equal to twice its vertical range of action.

Finally, a horn head of the type shown in FIGURES 1 to 3 has a width L theoretically equal to twice the horizontal range of action C, referred to the axis, and a height H at least equal to twice the vertical range of action V of the head.

In practice other considerations intervene to establish the dimensions of the head so that the width and the height of the latter are not strictly equal to twice the horizontal range of action and twice the vertical range of action, respectively.

FIGURE 4 thus shows by way of example a known head which in its principle is in accord with the type described above and has been designed in particular to be adapted to be coupled to the Russian SA3 coupler head.

In order for this coupling to be possible, the height of the small claw 2 above the axis X (or Z) is fixed at 200 mm., the upper horizontal plane 3c of the horn is fixed at 180 mm. below said axis, and the lower end of attack of the slopes 3a of the horn must be 235 mm. below the axis X (or Z).

Furthermore, the width $l$ of the small claw is fixed at 70 mm. and the horn terminates at the bottom in a vertical portion 3d of a height at least equal to 50 mm., in order to assure definite contact at the place of the horn between said head and the associated coupler head at the time they enter into contact (the "ideal" contact line 3b of the theoretical head would obviously not assure such a contact). Under these conditions, and if the head is to have a horizontal range of action of ±220 mm. and a vertical range of action V of 150 mm., its dimensions must be: in width, at least 2×200+70=510 mm.; in height, at least 200×235+50=485 mm.

It will be noted that the theoretical condition, in accordance with which the height H of the head must be at least equal to twice the value of its vertical range of action, is by and large respected.

FIGURES 5 to 7 relate to another known theoretical type of horn coupler head which differs essentially from the preceding one by the fact that a horn 3 is provided with a vertical wall 3d of a height h at least equal to the value of the vertical range of action V of the head (FIGURE 3).

In this type of head, as a matter of fact, one of the end contacts, defining the limits of the range of vertical action of the head, corresponds to a contact between the bottom of the lower part 3d of the horn of one head with the top of the lower part 3d' of the horn of the associated head, while in the type of head previously described with reference to FIGURE 3, there was concerned a contact between the bottom of the horn of one head and the top of the small claw of the associated head.

In FIGURE 7 there are shown the extreme contacts of the horns of the two associated coupler heads, one head being simply indicated by its horn 3' sketched in dotted line.

It results in effect from the nature of these extreme contacts that the height of the part 3d of the horn must be at least equal to the value of the vertical range of action V of the head and that therefore the total height of the head, instead of being at least equal to 2V as in the previous case must be at least equal to (2V+V), namely to 3V.

The extreme contacts defining the limits of the horizontal range of action of the head are shown, with similar convention, in FIGURE 6. From this figure it can be seen that one of these limits corresponds to a contact between the end of the horn 3 of one head, with the end of the horn 3' of the associated head (instead of corresponding, as in the case of FIGURE 2, to a contact between the end of the horn of one head with the small claw of the associated head), and that the other limit corresponds to a contact between the end of the large claw 1 of one head with the small claw 2' of the associated head.

If one designates by $a$ and $b$ respectively, the distance from the longitudinal axis Z of one head to the longitudinal axis Z' of the associated head, for each of the extreme contacts, the sum $(a+b)$ of these distances represents twice the horizontal range of action referred to the axis ("C"):

$$a+b=2C$$

Furthermore, taking into account the identity of the heads and their respective positions, and knowing that the longitudinal axis of one head is a central axis for said head, one can write, in accordance with FIGURE 6, that:

$$a=\frac{L}{2}-d$$

and $b=L$, this being:

$$a+b=\frac{L}{2}-d+L=\frac{3}{2}L-d=2C$$

whence finally:

$$L=\frac{4C}{3}+\frac{2d}{3}$$

By convention $d$ is taken equal to 90 mm., whence:

$$L=\frac{4C}{3}+60$$

The width L and the height H of this known theoretical type of horn coupler head are therefore equal respectively to:

$$L=\frac{4C}{3}+60$$

$$H=3V$$

C and V designate respectively the value of the horizontal range of action referred to the axis of the coupling and the value of the vertical range of action of the coupling head.

As in the case of the preceding type of head, the dimensional characteristics of the coupling heads of this type can in practice be greater than the values resulting from these formulas which have been established for the theoretical head.

FIGURE 8 relates to a practical embodiment of a coupling head, which embodiment is designed to permit the coupling of the head with the Russian type SA3 coupler head.

Therefore, the head is subjected to the same conditions as those previously indicated in connection with the embodiment in FIGURE 4 and, for a horizontal range of action of ±220 mm. and a vertical range of action of 150 mm., its overall dimensions are 400 mm. in width (namely, substantially the theoretical width plus the width of the small claw which is 70 mm.), and 635 mm. for the height (namely 200+235+150 mm.), respectively.

FIGURES 9 to 11 relate to a theoretical coupler head of a type having protruding parts on the large claw 1 and corresponding recessed parts 5 behind the small claw 2.

FIGURE 9 shows from the front this type of head and FIGURES 9a and 9b are vertical sections through the parts in relief 1a and 1b of the large claw, and the corresponding recessed 5a and 5b, respectively.

The height of the protruding parts 1a or 1b or of the recessed parts 5a and 5b defines the value of the vertical range of action V of the coupler head, since the limits of this range of action correspond to a contact between the point of the protruding portion 1c of one head and the end 5d or 5e of the recessed parts of the associated head, and vice versa.

The limits of the horizontal range of action of this type of head correspond, on the one hand, to an extreme contact between the small claw 2 of the one head with the small claw 2' of the associated head, and on the other hand, to an extreme contact between the large claw 1 of one head with the small claw 2' of the associated head (FIGURE 10).

As customary, the horizontal range of action referred to the coupling axis, namely "C," is equal to half the value of the sum $(a+b)$ of the distances from the axis Z to the axis Z', for the two extreme cooperating positions.

Now, then, in view of the symmetry of each head with respect to its longitudinal axis, Z or Z', and taking into consideration the identity of the heads and their respective positions, one can write:

$$2C=a+b$$
$$b=2d$$
namely $\quad 2C=a+d$
or $\quad a=2C-2d$

Furthermore $$\frac{L}{2}=a+d$$

whence $\quad L=2a+2d$ and $\quad L=2(2C-2d)+2d=4C-2d$

For a conventional value of $d$ equal 90 mm., the width of the coupler head of this type is therefore equal to:

$$L=4C-180$$

The height of the coupler head is in practice greater than twice the value of the range of vertical action due to the fact that the recessed and protruding portions do not have strictly the profile shown.

FIGURES 11 and 12 show by way of example and very schematically a coupler head which has actually been made, FIGURES 11, 11a and 11b and 12 corresponding respectively to FIGURES 9, 9a and 9b and 10.

From these figures it can be seen that the protruding portions 1a and 1b of the front face of the large claw no longer meet each other but are separated by a vertical flat 1d. Furthermore, they start with horizontal flats 1e and 1f. The vertical flat 1d has the purpose of assuring the definite making of contact between the large claw in question and the small claw of the coupled head, the horizontal flats 1e and 1f have the purpose of assuring rigidity of the coupling produced, cooperating with corresponding flats of the recessed portions.

For a vertical range of action of value V, the height of the coupling head is therefore equal to twice said value, plus the height of the vertical flat and the thicknesses necessary for rigidity; this height is commonly 30 mm. for the flat 1d, and these thicknesses of 25 mm. for each of the thicknesses $e$ and $f$ relative to the flats 1e and 1f.

Now then, the height H of the coupler head of the vertical range of action V is given by the formula:

$$H = 2V + 80$$

For a horizontal range of action of ±220 mm. and for a vertical range of action of 150 mm., the theoretical dimensions of this known type of coupler head are therefore the following: for the width, $L = 4 \times 220 - 180 = 700$ mm., for the height, $H = 2 \times 150 + 80 = 380$ mm.

In the following table there are indicated the overall dimensions (width and height) and the height below the axis of the known theoretical (T) and practical (P) coupler heads which have been mentioned previously, assuming for all these heads a horizontal range of action of ±220 mm. and a vertical range of action of 150 mm.

|  | First type with horn | | Second type with horn | | Type without horn | |
| --- | --- | --- | --- | --- | --- | --- |
|  | T | P | T | P | T | P |
| Width | 440 | 510 | 354 | 400 | 700 | 700 |
| Height | 300 | 485 | 450 | 635 | 300 | 380 |
| Height below the axis |  | 285 |  | 435 |  |  |

From an examination of this table it appears that none of the said heads ideally satisfies the condition sought, which is small width of head combined with a small height of head below the axis.

The head which is of greatest interest due to its small width, namely the horn head of the second type—the width of which is 400 mm., has a height below the axis which is much too high (435 mm.), while the head which is of greatest interest because of its small height below the axis, namely the head without horn, is on the other hand the widest (700 mm.).

If one wishes to modify the horn head of the second type to decrease its height below the axis, one arrives at the horn head of the first type, the height of which below the axis is actually smaller (285 mm. instead of 435 mm.), but the width of the head of which is then increased, passing from 400 mm. to 510 mm.

Thus in accordance with the invention it has been sought to modify the hornless head in order to decrease its width without prejudicing the value of its horizontal range of action, or—which comes down to the same—it has been attempted to modify this head so as to increase its horizontal range of action without increasing its width.

The horizontal range of action of a head without a horn of the type described being delimited (FIGURE 10), on the one hand by an extreme contact between the small claw of one head and the small claw of the associated head, and, on the other hand by an extreme contact between the large claw of one head and the small claw of the associated head, a commonplace solution would have consisted—in order to increase this range of action—of moving away one of these limits laterally, for instance, by increasing the width of the large claw of the head, but this solution would have at the same time resulted in an increase of the width of the coupler head.

In accordance with the present invention, on the other hand, the horizontal range of action of such a head is increased without increasing the width of the head, if one provides it with a horn 3 having a front face 3a which is vertical and oblique towards the front and a horizontal top face 3b.

Due to the presence of this horn, as a matter of fact, the limit of the range of action which corresponded to a contact between the small claw of one head and the small claw of the associated head, now corresponds to a contact between the horn of one head and the small claw of the associated head, or rather to a contact between the horn of one head and the horn of the associated head.

FIGURES 13 and 14, on the one hand, and 15 and 16, on the other hand, schematically illustrate examples of two embodiments of the head which is thus modified in accordance with the invention.

FIGURES 13 and 14 show an embodiment in which the two contacts defining the limits of the horizontal range of action of the head are effected in the one case (FIGURE 13) between the large claw 1 of one head with the small claw 2' of the associated head (as in the case of FIGURE 10), and the other (FIGURE 14), between the horn 3 of one head and the small claw 2' of the associated head.

It can be seen from the figures that the total horizontal range of action of this head, namely $(a+b)$ is larger than the horizontal range of action of the head of FIGURE 10, by the value of the difference $e$ between the small claws of the heads (FIGURE 14).

In the case of a horn, the end of which is 180 mm. from the longitudinal axis of the coupling $d+e=180$ mm., the end of the small claw being fixed conventionally at 90 mm. from said axis ($d=90$ mm.), the value of the distance $e$ is substantially equal to 100 mm.

The total horizontal range of action of the coupler head is greater by 100 mm. than that of the head of the type of FIGURE 10; its horizontal range of action referred to the axis ("C") is therefore greater by 50 mm.

It is seen from the figures that the width of the head is substantially the same whether the head is or is not provided with a horn, due to the fact that the latter extends obliquely forward.

The embodiment of FIGURES 15 and 16 relates to a coupler head which is also modified by the addition of a horn, but under circumstances such that one of the extreme contacts of the two heads of a coupling is effected between the horns 3 and 3' of the two heads (FIGURE 16), the other contact taking place always between the large claw 1 of one head and the small claw 2' of the associated head (FIGURE 15).

Now then, the increase $f$ of the total horizontal range of action of the head with respect to the range of action of the head of the type of FIGURE 10 is greater than the increase $e$, the value of the increase $f$ being substantially equal to $2 \times (180-90) = 180$ mm.

The horizontal range of action "C" referred to the axis has therefore increased by about 90 mm.

Thus, considering a coupler head of a type having protruding and recessed portions, respectively, on the large claw and behind the small claw, or vice versa (coupler head commonly known as "the lateral pocket" head), this head having a horizontal range of action of ±220 mm., one can, adding to it in accordance with the present invention a horn which advances 180 mm. from the longitudinal axis of the head, increase this range of action to ±270 mm. or even ±310 mm., without increasing the width of the head.

The form of the added horn can be substantially simpler than that of the horns of the known horn heads, and in particular, in accordance with the one feature of the invention, the horn can be flat and without inclined portions (FIGURE 1) which were intended to guide the vertical rise of the head with respect to the associated head, in cooperation with corresponding inclined portions located below the large claw of said head.

In the head of the invention, as a matter of fact, the guiding of the vertical rise of one head with respect to the other can be assured by the cooperation of the inclines 1a and 1b of the protruding portions located on the front face of the large claw 1 of one head, with the inclines 5a, 5b of the recessed portions located behind the small claw 2 of the associated head.

FIGURES 17 to 20 are related to such an embodiment of a head, in accord with the invention, of the type having protruding parts and recessed parts, respectively, on the large claw 1 and behind the small claw 2, and characterized by the presence of a flat horn 3, extending below the small claw 2 of the head and being directed obliquely forward.

This head is seen from the front in FIGURE 17 and from the side in FIGURE 18, while FIGURES 19 and 20 show respectively the upper limit contact and the lower limit contact which define the vertical range of action V of the head.

In the embodiment shown the horn—the height of which is 30 mm.—is designed so that one of the limits of the horizontal range of action of the head corresponds to a contact between the horn of said head and the claw of the associated head (case of FIGURE 14).

Furthermore, the dimensions of the head were selected in such a manner that the horizontal range of action is ±220 mm. and the vertical range of action 150 mm., and in such a manner that the head could be associated with that of the Russian type SA3 coupler head.

These conditions are realized in practice by imparting to the coupler head a width of 510 mm., a total height of 540 mm. and a height below the axis of 340 mm.

If one compares these dimensional characteristics with those of the coupler heads of the second type of horn and of the known type without horn, which have been previously described, it is noted that for equivalent performance the head of the invention has a width (510 mm.) which is substantially less than that (700 mm.) of the coupler head which would be of most interest in view of its short height below the axis, and a height below the axis (340 mm.) substantially less than that (435 mm.) of the horn coupler head which would be of the greatest interest because of its small width.

Of course, the shape and dimensions of the protruding and recessed portions, as well as those of the horn, may vary in accordance with the specific case, without going beyond the scope of the present invention.

It will be understood that the horn of the coupler heads in accord with the invention is one means among others for providing these heads with a contact and sliding surface 3a (3'a) located in a vertical plane oblique with respect to the vertical plane containing the Z (Z') axis of the coupler head and situated entirely in front of and below the small claw, said surface being delimited at the top by a horizontal surface 3b (3'b).

Instead of being the front face of a horn which constitutes a downward extension of the small prismatic claw, this contact and sliding surface may, in a variant, be composed of the front face of an appendage extending downward and forward from the portion of the head which has protrusions or recesses behind the small coupling claw.

Finally, in another embodiment this contact and sliding surface could be formed with the front face of an appendage located above the horizontal plane passing through the Z (Z') axis of the head, although this variant is considered to be less interesting.

I claim:
1. An automatic coupler head comprising:
a large hook-shaped claw and a small prismatic claw on the front face of the head,
a forwardly protruding portion and a recess adapted to receive said protruding portion, one of said protruding portion and recess being carried by said large claw and the other being located behind said small claw,
said portion being defined by two forwardly converging inclined surfaces, the forward edges of said inclined surfaces being joined by a vertical surface, and the rearward edges of said inclined surfaces being contiguous with horizontal surfaces,
said recess being defined by two rearwardly converging inclined surfaces, the rearward edges of said inclined surfaces being joined by a vertical surface, and the forward edges of said inclined surfaces being contiguous with horizontal surfaces,
a member located below and in front of said small claw, said member having a contact and sliding surface arranged in a vertical plane which is oblique with respect to the vertical plane containing the longitudinal axis of the coupling, and said member having a horizontal top surface, said contact and sliding surface serving to increase the horizontal range of action of the head without correspondingly increasing the width of the head.

2. An automatic coupler head according to claim 1 wherein said contact and sliding surface forms the front face of a horn, and said horn is a horizontal extension protruding laterally and forwardly from the bottom of the front face of said small claw.

References Cited

UNITED STATES PATENTS 3,164,266   1/1965   De Penti et al. _____ 213—100

FOREIGN PATENTS 1,352,790   1/1964   France.
1,017,066   9/1962   Great Britain.
46,048   9/1962   Poland.

DRAYTON E. HOFFMAN, *Primary Examiner.*